(12) United States Patent
Miller et al.

(10) Patent No.: US 10,352,367 B2
(45) Date of Patent: Jul. 16, 2019

(54) VEHICLE TRANSFER CASE WITH VARIABLE ANGLE JOINT

(71) Applicants: GKN Driveline North America, Inc., Auburn Hills, MI (US); Michael James Miller, White Lake, MI (US); Eric J. LaMothe, Clarkston, MI (US); Sam Junior D'Angelo, Royal Oak, MI (US); Robert Leslie Cassell, Lake Orion, MI (US)

(72) Inventors: Michael James Miller, White Lake, MI (US); Eric J. LaMothe, Clarkston, MI (US); Sam Junior D'Angelo, Royal Oak, MI (US); Robert Leslie Cassell, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 125 days.

(21) Appl. No.: 15/025,904

(22) PCT Filed: Oct. 11, 2013

(86) PCT No.: PCT/US2013/064677
§ 371 (c)(1),
(2) Date: Mar. 30, 2016

(87) PCT Pub. No.: WO2015/053792
PCT Pub. Date: Apr. 16, 2015

(65) Prior Publication Data
US 2016/0238084 A1 Aug. 18, 2016

(51) Int. Cl.
*F16D 3/223* (2011.01)
*B60K 17/22* (2006.01)
(Continued)

(52) U.S. Cl.
CPC .............. *F16D 3/223* (2013.01); *B60K 17/22* (2013.01); *F16D 3/845* (2013.01); *B60K 17/344* (2013.01);
(Continued)

(58) Field of Classification Search
CPC .................... F16D 3/223; F16D 3/845; F16D 2003/22316; F16D 2003/22326; B60K 17/22; B60K 17/344; Y10S 464/906
(Continued)

(56) References Cited

U.S. PATENT DOCUMENTS 3,928,985 A 12/1975 Girguis
4,289,213 A 9/1981 Seaman
(Continued)

FOREIGN PATENT DOCUMENTS

CN 1407258 A 4/2003
CN 101351654 A 1/2009
(Continued)

OTHER PUBLICATIONS

Written Opinion & International Search Report for PCT/US2013/064677 dated Feb. 27, 2014, 9 pages.
(Continued)

*Primary Examiner* — Greg Binda
(74) *Attorney, Agent, or Firm* — Jennifer M. Brumbaugh; Reising Ethington P.C.

(57) ABSTRACT

A torque transfer device for a vehicle may include a housing and a variable angle constant velocity joint integrated with the housing. The joint may be connected between a drive mechanism and an output shaft for transmitting torque from the drive mechanism to the output shaft.

13 Claims, 6 Drawing Sheets

(51) Int. Cl.
*F16D 3/84* (2006.01)
*B60K 17/344* (2006.01)

(52) U.S. Cl.
CPC .............. *F16D 2003/22316* (2013.01); *F16D 2003/22326* (2013.01); *Y10S 464/906* (2013.01)

(58) Field of Classification Search
USPC .......................... 464/145, 178; 475/202, 222
See application file for complete search history.

(56) References Cited

U.S. PATENT DOCUMENTS

| | | |
|---|---|---|
| 4,469,188 A | 9/1984 | Mita |
| 4,632,207 A | 12/1986 | Moore |
| 4,648,492 A | 3/1987 | Moore |
| 4,747,805 A | 5/1988 | Welschof et al. |
| 4,869,556 A * | 9/1989 | Gees .................. B60K 17/22 |
| 5,116,293 A | 5/1992 | Reuter |
| 5,156,571 A * | 10/1992 | Kapaan .................. F16D 3/221 |
| | | 464/906 |
| 5,226,860 A | 7/1993 | Baxter et al. |
| 5,599,249 A | 2/1997 | Zalewski et al. |
| 5,609,540 A | 3/1997 | Brissenden et al. |
| 5,634,863 A | 6/1997 | Brissenden et al. |
| 5,916,055 A | 6/1999 | Wormbaecher |
| 6,319,132 B1 | 11/2001 | Krisher |
| 7,029,399 B2 | 4/2006 | Oki et al. |
| 7,211,002 B2 | 5/2007 | Dine et al. |
| 7,252,616 B2 | 8/2007 | Wormsbaecher |
| 7,418,434 B2 | 8/2008 | Barry |
| 7,419,434 B2 | 9/2008 | Wormsbaecher |
| 7,736,239 B2 * | 6/2010 | Niederhufner .......... F16D 3/845 |
| | | 464/906 |
| 7,828,108 B2 | 11/2010 | Schlangen et al. |
| 7,997,990 B2 | 8/2011 | Hahn et al. |
| 8,387,740 B2 | 3/2013 | Melcher |
| 8,430,778 B2 | 4/2013 | Creek et al. |
| 2007/0238535 A1 | 10/2007 | Wormsbaecher |
| 2017/0292570 A1 * | 10/2017 | Ketchel .................. F16D 3/227 |

FOREIGN PATENT DOCUMENTS

| | | |
|---|---|---|
| EP | 0908639 A2 | 4/1999 |
| EP | 2277732 B1 | 10/2011 |
| JP | 2017024522 A | 2/2017 |

OTHER PUBLICATIONS

EP Extended Search Report for EP Application No. 13895203.1 dated Dec. 6, 2017 (8 pages).
CN Office Action for CN Application No. 201380080171.3 dated Feb. 1, 2018 (12 pages).
CN Office Action for CN Application No. 201380080171.3 dated Sep. 11, 2018 (13 pages).

* cited by examiner

VEHICLE TRANSFER CASE WITH VARIABLE ANGLE JOINT

TECHNICAL FIELD

The present disclosure relates to a vehicle transfer case having a variable angle constant velocity joint integrated therein.

BACKGROUND ART

Four-wheel-drive and all-wheel-drive vehicles having transfer cases are well known. The transfer case may be driven by a chain or a set of gears to transmit torque from a vehicle transmission to both front and rear axles. This transfer case may be controlled by a shifter similar to one operated by a driver in a manual transmission. However, the transfer case may instead be electronically operated by a switch. Moreover, all-wheel-drive sports cars may have transfer cases that are not selectable but rather are permanently disposed in an all-wheel-drive configuration.

When vehicle manufactures decrease the size of vehicles, the length of the front shaft may decreased, which may in turn increase the angle between the shortened propeller shaft and the output shaft to which it is coupled. In this respect, transfer cases having fixed angle joints may be configured for use in only one vehicle size. It would therefore be desirable to provide a transfer case having a variable angle joint for use with a variety of vehicles.

DETAILED DESCRIPTION

Exemplary illustrations are described below. In the interest of clarity, not all features of an actual implementation are described in this specification. It will of course be appreciated that in the development of any such actual illustration, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

According to various exemplary illustrations described herein, a torque transfer device (hereinafter "transfer case") may receive torque from an input shaft that is coupled to a vehicle transmission, which may in turn receive torque from a vehicle engine. The transfer case may have a variable angle constant velocity joint (hereinafter "CV joint") integrated directly therein to reduce weight, parts and packaging into an overall front driveline system.

Figure 1:
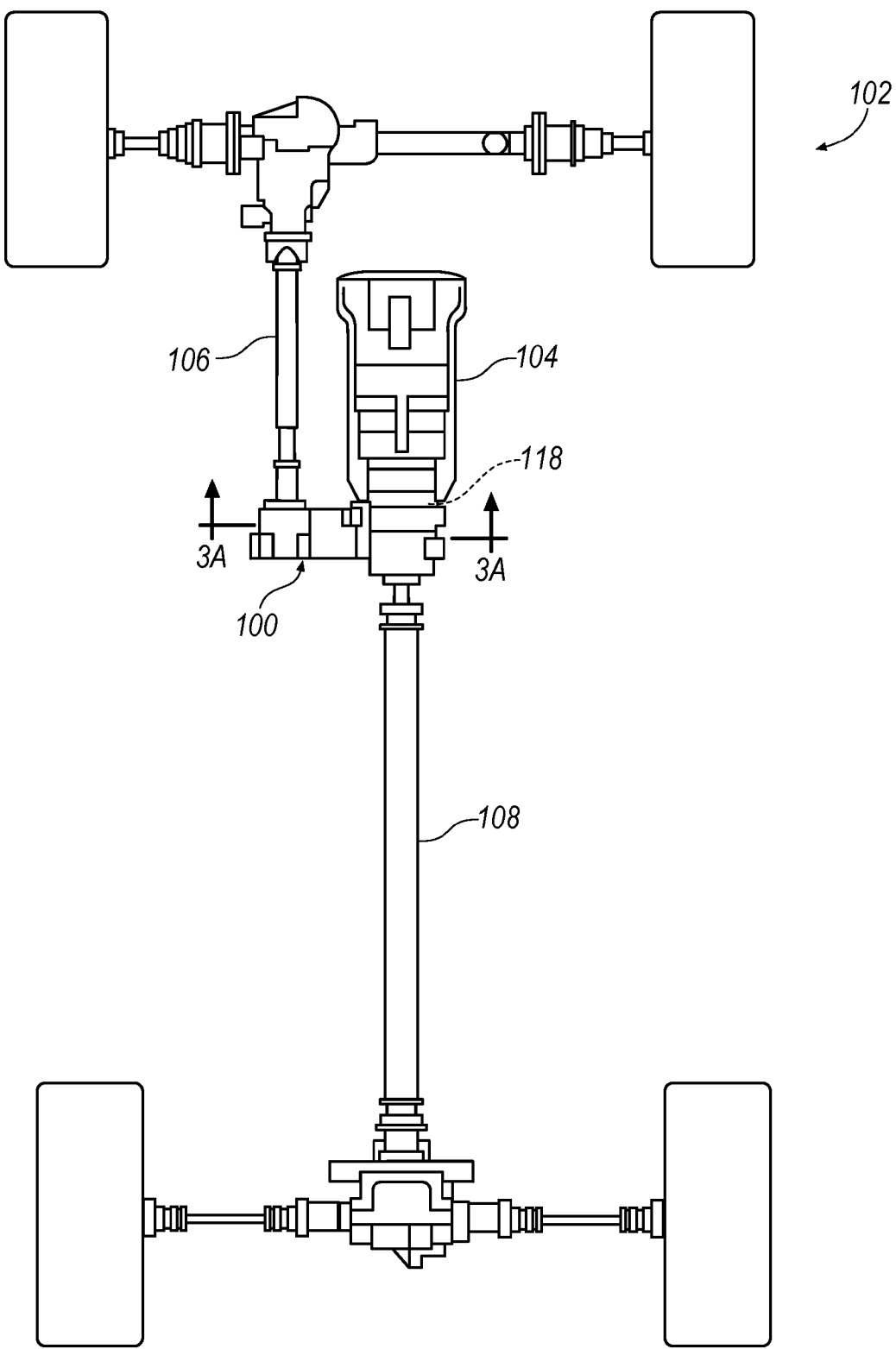
FIG. 1 is a schematic diagram of a driveline for a vehicle having a four-wheel-drive system including one exemplary illustration of a torque transfer device
Figure 2:
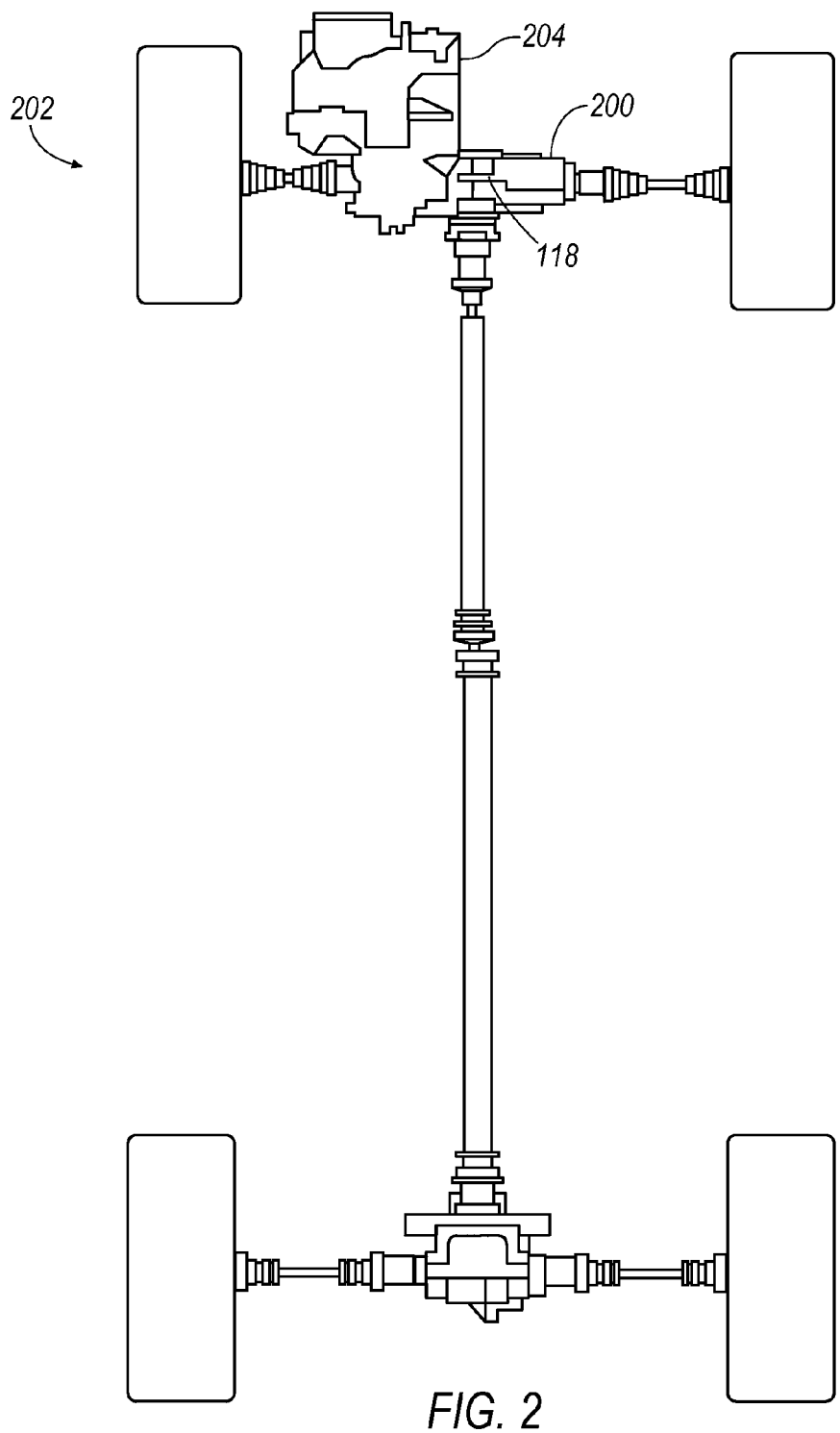
FIG. 2 is a schematic diagram of a driveline for a vehicle having an all-wheel-drive system including one exemplary illustration of a torque transfer case.

Referring to FIG. 1, one exemplary illustration of a transfer case 100 may be used in a four-wheel-drive system 102 of a vehicle, such that the transfer case 100 transmits torque from a vehicle transmission 104 to both a front output shaft 106 and a rear output shaft 108. Referring to FIG. 2, another exemplary illustration of a transfer case 200 may be used in an all-wheel-drive system 202 of a vehicle. However, the transfer case may be used in any suitable driveline, including, for example, front-wheel drive only vehicles and rear-wheel drive only vehicles.

Figure 3A:
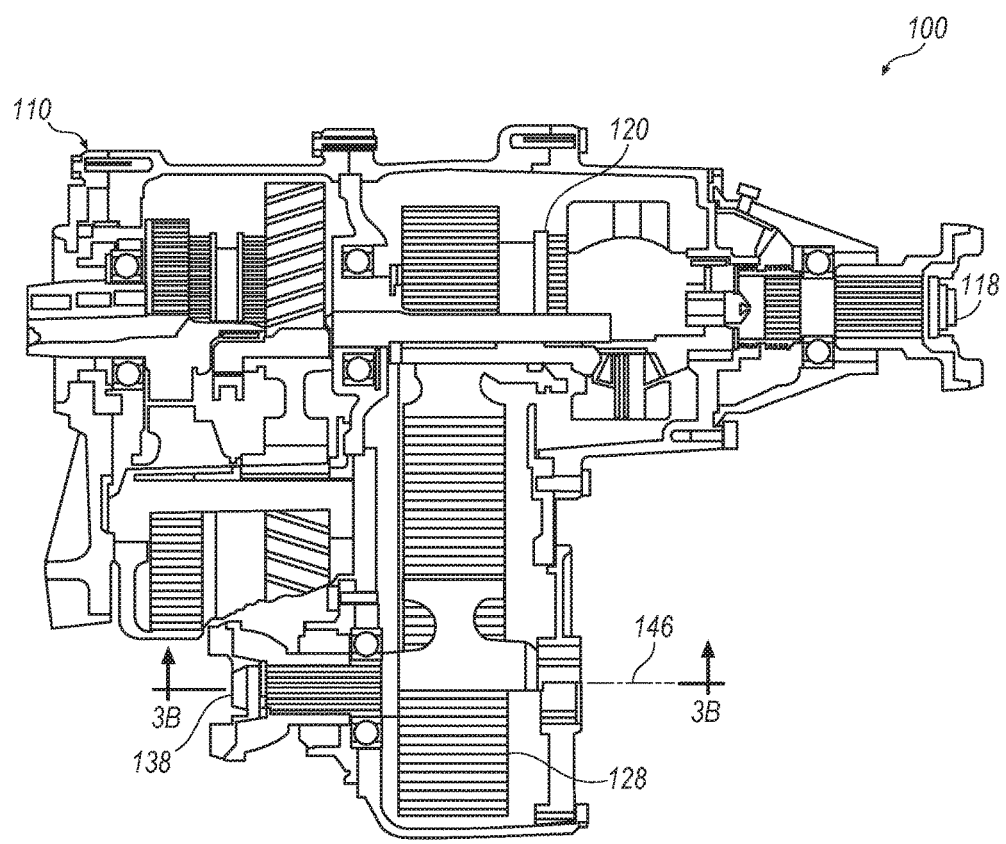
FIGS. 3A and 3B are cross-sectional views of one exemplary illustration of the torque transfer case of FIG. 1, as taken along lines 3A-3A and 3B-3B.
Figure 3B:
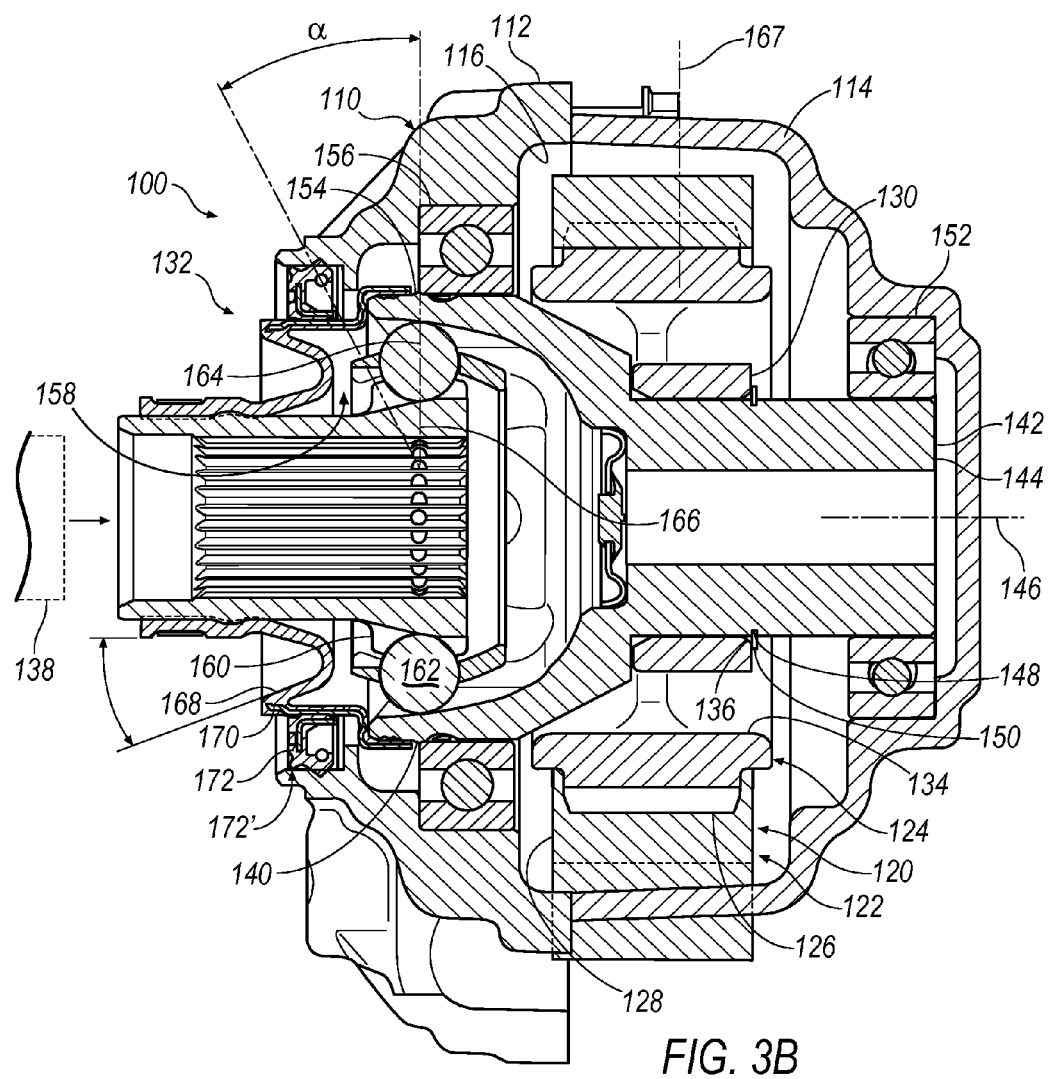

Referring now to FIGS. 3A and 3B, the transfer case 100 may include a housing 110 having two or more mating portions 112, 114, which define a cavity 116. The transfer case 100 may further have an input shaft 118 (FIG. 1) disposed within the cavity and coupled to the transmission 104 to receive torque from the transmission. Further, as shown in FIGS. 3A and 3B, the transfer case 100 may have a drive mechanism 120 integrated within the housing 110 and disposed within the cavity 116. The drive mechanism 120 may be coupled to the input shaft to receive torque therefrom. In this example, the drive mechanism 120 may be a chain-driven torque transfer system 122, which includes a sprocket mechanism 124 having a plurality of teeth 126 and a chain 128 interconnecting the teeth 126 extending from the sprocket mechanism 124 and teeth (not shown) extending from the input shaft. The sprocket mechanism 124 may further include a sprocket hub 130 for receiving a variable angle constant velocity joint 132, as shown in FIG. 3B and described in further detail below. However, of course, the sprocket mechanism may instead include a male connector for attachment to a female connector extending from the joint. In this example, the sprocket hub 130 may be disposed concentrically within an inner diameter 134 of the sprocket mechanism 124. In addition, the sprocket hub 130 may include one or more beveled edges 136 to facilitate insertion of the CV joint 132 into the sprocket hub 130. Of course, the drive mechanism may instead be a bevel gear torque transfer system or other suitable torque transfer systems.

The transfer case 100 may further include the CV joint 132 integrated with the housing 110. The CV joint 132 may be in operable connection between a drive mechanism 120 and an output shaft 138 for transmitting torque from the drive mechanism 120 to the output shaft 138. At least a portion of the CV joint 132 may be disposed within the cavity 116. In this example, the CV joint may include an outer race 140 that is entirely disposed within the cavity 116 and is connected to the drive mechanism 120 to receive torque from the same. In particular, the outer race 140 may include a stem 142 having an aft portion 144 received through the sprocket hub 130 during assembly and keyed to the sprocket hub, such that the outer race 140 and the sprocket mechanism rotate in synchronization about a common rotational axis 146. The stem 142 may have an annular groove 148 for receiving a retaining clip 150, that axially retains the sprocket 130 to the outer race 140. However, the outer race 140 may be coupled to the sprocket mechanism 124 by a weld, a splined interface, a threaded fastener or various other suitable fasteners and related fastening methods. Also, in this example, the aft portion 144 may be rotatably mounted to the housing 110 by a bearing 152. The outer race 140 may further include a bell portion 154, which extends from the stem 142 and is disposed opposite to the aft portion 144 along the rotational axis 146. The bell portion 154 may be rotatably mounted to the housing 110 by a bearing 156 and may define a chamber 158. Further, the CV joint 132 may include an inner race 160 rotatably mounted within the chamber 158 of the outer race 140 and receiving torque from the outer race 140 by a plurality of torque transmitting balls 162 or other rolling elements coupling the outer and inner races to one another for transmitting torque therebetween. The inner race 160 may be connected to the output shaft 138, e.g. by splines, to transmit torque to the same.

As best shown in FIG. 3B, the inner race 160 is movable to a plurality of angles with respect to the outer race 140 so as to provide the variable angle CV joint 132 and permit angular movement of the output shaft 138. For example, the bell portion 154 of the outer race 140 may be configured to rotate in a first rotational plane 164, and the inner race 160 may be configured to rotate in a second rotational plane 166. The inner race 160 may be pivotally mounted within the bell portion 154 of the outer race 140, such that the second rotational plane 166 may be offset from the first rotational plane 164 by up to a predetermined angle α. In one example, the angle α may be the minimum clearance between the inner race 160 and the boot cap 170 as the inner race 160 and shaft therein 138 pivot toward the boot cap 170. Various styles of the CV joint 132 with a variable angle inner race could be used in this invention, such as fixed styles of CV joints that could include Rzeppa joints, countertrack joints and plunging joints.

Furthermore, in this example, the outer race 140 and the sprocket mechanism 124 may not rotate within the same homokinetic plane. In particular, the first rotational plane 164 of the bell portion 154 of the outer race 140 may be offset from a rotational plane 167 of the teeth 126 on the sprocket mechanism 124, in an axial direction along the common rotational axis 146, such that the teeth 126 and the bell portion 154 do not rotate within the same plane.

The CV joint 132 may further include an elastic boot 168 extending radially between the inner race 160 and the outer race 140, so as to prevent contaminants from fouling lubricant in the chamber 158 or depositing on the outer race 140, the inner race 160 and the torque transmitting balls 162. In addition, the CV joint 132 may also include a boot cap 170 clamping or otherwise fastening the boot 168 to the outer race 140. This boot cap 170 may have an inner diameter that is greater than an outer diameter of the output shaft 138 to provide clearance for the output shaft 138 to pivot toward the inner diameter.

The transfer case 100 may further include a seal 172 extending between the housing 110 and at least one of the boot cap 170 and the outer race 140, so as to prevent a contaminant from fouling lubricant in the cavity 116 and accumulating on the teeth 126, the chain 128 and the bearings 152, 156. In this example, the seal 172 is a rotating shaft seal 172' press-fitted onto the boot cap 170 of the joint 132 and extending between the housing 110 and the boot cap 170.

Figure 4:
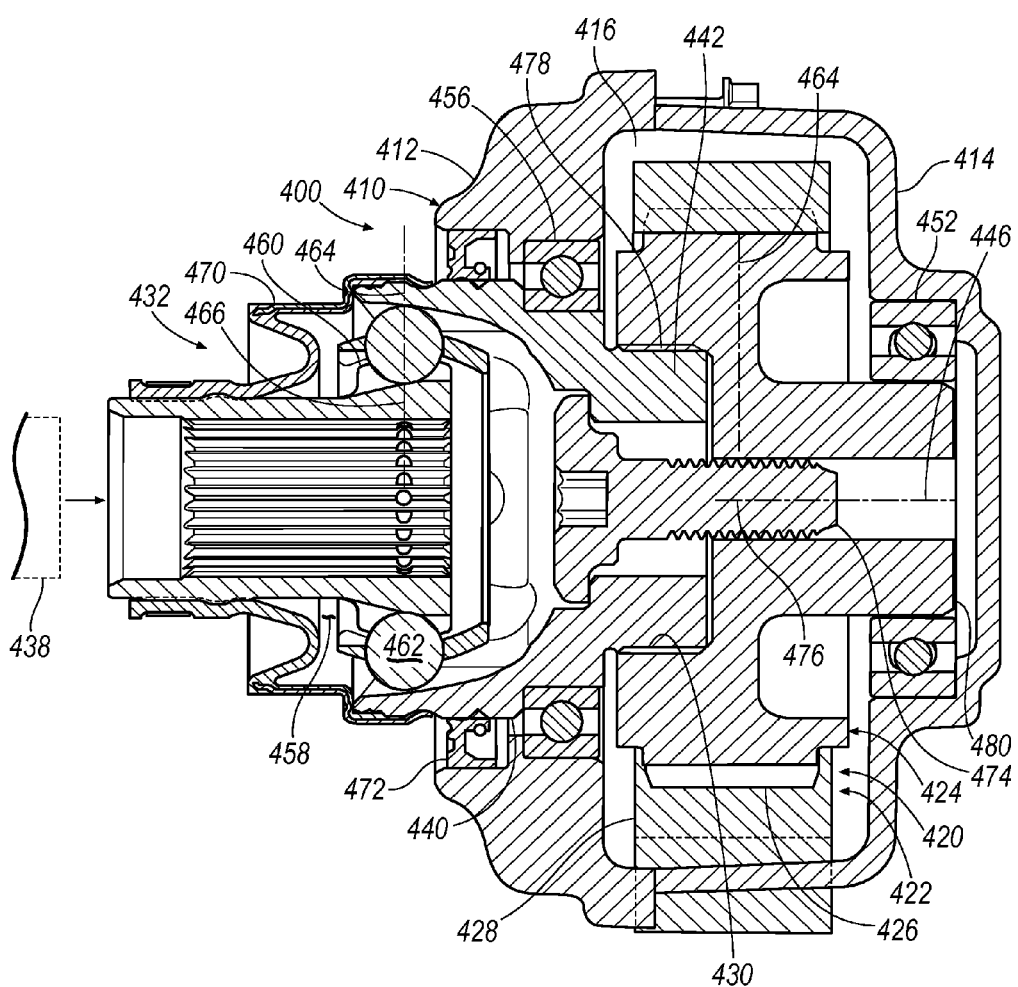
FIG. 4 is a cross-sectional view of another exemplary illustration of the torque transfer case of FIG. 1.

Turning now to FIG. 4, another exemplary illustration of a transfer case 400 is substantially similar to the transfer case 100 of FIG. 3, and may include similar components identified with reference numerals in the 400 series. However, this transfer case 400 may include the CV joint 432 having at least the inner race 460 and torque transmitting balls 462 disposed external to the cavity 416 of the housing 410, in contrast to the transfer case 100 of FIGS. 3A and 3B including the inner race 160 and the torque transmitting balls 162 disposed within the cavity 116. Furthermore, the stem 442 of the outer race 440 may not be rotatably mounted to the housing 410 but rather fixedly held directly within the sprocket hub 430 of the sprocket mechanism 424 by, for example, a threaded fastener 474 engaging a threaded hole 476 formed in the sprocket mechanism 424. Moreover, the stem 442 and the sprocket hub 430 may have a splined interface 478, such that the outer race 440 may be coupled to the sprocket mechanism 424 for rotating in synchronization with the sprocket mechanism 424 about the common rotational axis 446. In addition, the sprocket mechanism 424 may have an aft hub portion 480 rotatably mounted to the housing 410 by a bearing 452. Further, the seal 472, in this form, may be sandwiched between the boot cap 470 and the housing 110 but rather sandwiched between the outer race 440 and the housing 410.

Figure 5:
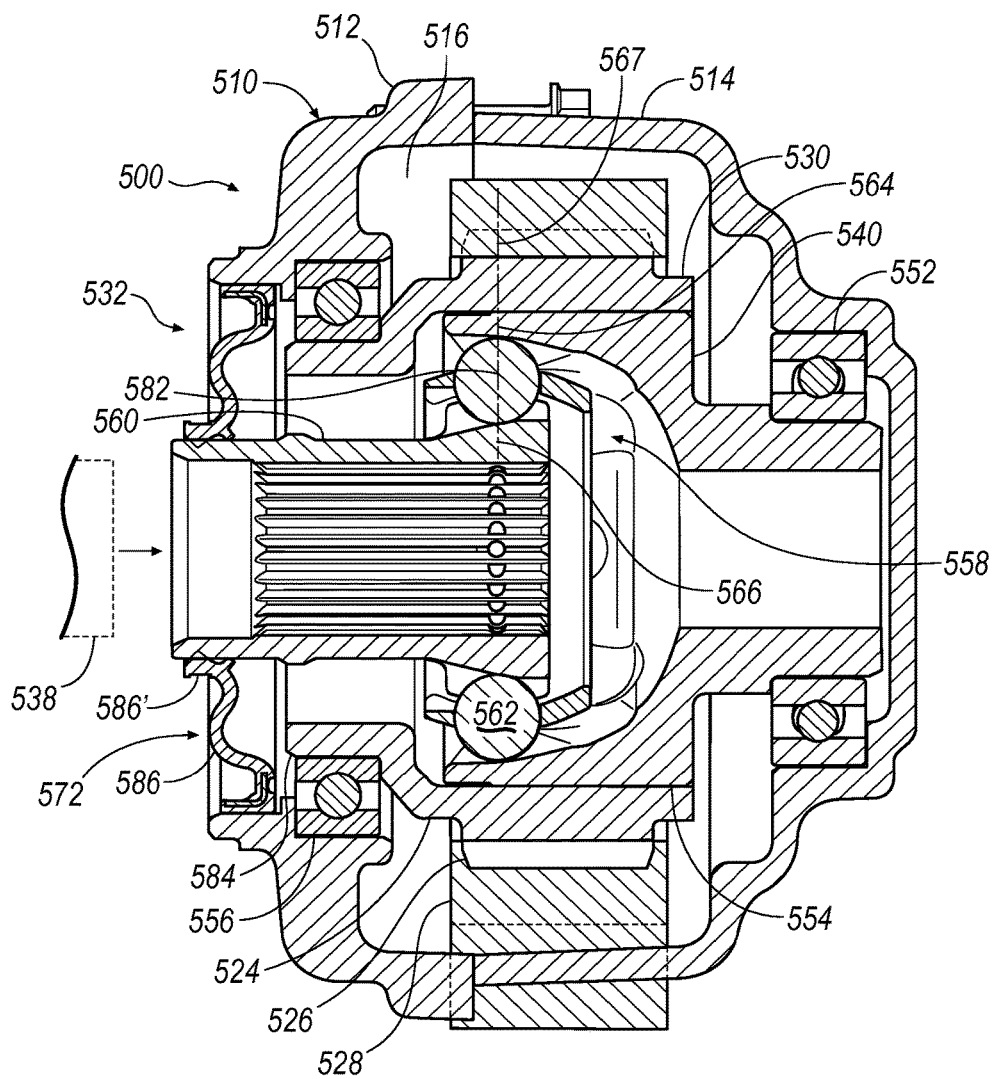
FIG. 5 is a cross-sectional view of still another exemplary illustration of the torque transfer case of FIG. 1.

Referring to FIG. 5, another exemplary illustration of a transfer case 500 is substantially similar to the transfer case 100 of FIG. 1, and may include similar components referenced with numerals in the 500 series. For example, the transfer case 100 of FIG. 3 may include the bell portion 154 of the outer race 140 rotatably mounted to the housing 110. However, the transfer case 500, in this example, may include a bell portion 554 of the outer race 540 coupled to the sprocket hub 530 of the sprocket mechanism 524 by, for example, welding the bell portion 554 to the sprocket hub 530. Furthermore, the teeth 526 of the sprocket mechanism 524 and the chamber 558 may be disposed at a common point along the common rotational axis, such that both the outer race 540 of the CV joint 532 and the sprocket mechanism 524 rotate in the same homokinetic plane 582. That is, the outer race 540 may be positioned on the sprocket mechanism 524, such that the first rotational plane 564 of the bell portion 554 and the rotational plane 567 of the sprocket mechanism 524 are aligned or coplanar. This feature may set the pivoting point of the output shaft farther from the driven shafts, such that the maximum angular movement for a smaller vehicle may be reduced, thus permitting the transfer case to be used in more vehicles. Furthermore, the sprocket mechanism 524, in this form, may include a forward hub portion 584 surrounding the output shaft 538 and having an inner diameter that is greater than an outer diameter of the output shaft 538 to provide clearance for the output shaft 538 to pivot toward the inner diameter. In addition, the forward hub portion 584 may be rotatably mounted to the housing 510 by a bearing 556. In this example, the cavity 516 of the housing 510 may fluidly communicate with the chamber 558 of the outer race 540, such that a common lubricant may reach the bearings 552, 556, the chain 528, the teeth 526, the outer race 540, the torque transmitting balls 562 and the inner race 560. The seal 572, in this form, may be a boot cover membrane 586 extending radially inward from the housing 510 and terminating with a rotating shaft seal 586' surrounding the output shaft 538.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain exemplary illustrations, and should in no way be construed so as to limit the claimed invention.

Accordingly, it is to be understood that the above description is intended to be illustrative and not restrictive. Many exemplary illustrations and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future exemplary illustrations. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed:

1. A torque transfer device for a vehicle, comprising:
   a housing;
   a constant velocity joint that includes:
   an outer race rotatably mounted within the housing; and
   an inner race positioned within the outer race and connected to the outer race by a plurality of torque transmitting balls;
   a drive mechanism within the housing and connected to said outer race of the constant velocity joint, and the drive mechanism transferring torque received from an input shaft of the torque transfer device to the outer race of the constant velocity joint such that the outer race drives the inner race, and wherein the drive mechanism includes a sprocket mechanism, and the outer race is coupled to the sprocket mechanism for rotating in synchronization with the sprocket mechanism about a common rotational axis;
   an output shaft connected to said inner race of the constant velocity joint; and
   an elastic boot extending between and connected directly to the inner race and the outer race, and the elastic boot prevents contaminants from depositing on at least one of the outer race, the inner race and the torque transmitting balls;
   wherein the inner race is pivotally mounted within the outer race such that the inner race may pivot relative to the outer race up to a predetermined angle.

2. The torque transfer device of claim 1, wherein the joint further comprises:
   a boot cap attaching the elastic boot to the outer race;
   wherein the boot cap has an inner diameter that is greater than an outer diameter of the output shaft to provide clearance for the output shaft to pivot toward the inner diameter.

3. The torque transfer device of claim 1, wherein the housing defines a cavity, and at least a portion of the joint is disposed within the cavity.

4. The torque transfer device of claim 1, wherein the outer race includes a stem coupled to the sprocket mechanism.

5. The torque transfer device of claim 1, wherein the outer race includes a stem rotatably mounted to the housing.

6. The torque transfer device of claim 1, wherein the outer race has a bell portion rotating in a first rotational plane and positioned on the sprocket mechanism, such that the first rotational plane of the bell portion is at least one of aligned and coplanar with a rotational plane of the sprocket mechanism.

7. The torque transfer device of claim 1, wherein the sprocket mechanism has a plurality of teeth receiving torque from the input shaft, and the outer race defines a chamber in which the inner race and the torque transmitting balls are disposed, and the chamber is offset from the teeth in an axial direction along the common rotational axis.

8. The torque transfer device of claim 1, wherein the outer race includes an aft portion and a bell portion, and both the aft and bell portions are rotatably mounted to the housing.

9. The torque transfer device of claim 1, wherein the housing defines a cavity and the inner race, balls and a portion of the outer race are disposed external to the cavity.

10. The torque transfer device of claim 9, wherein the outer race is coupled to the drive mechanism by a fastener.

11. The torque transfer device of claim 1, which also includes a boot cap that couples the elastic boot to the outer race, and a seal located between the boot cap and the housing.

12. The torque transfer device of claim 11, wherein the seal is a rotating shaft seal that is press-fit onto the boot cap and engages both the boot cap and the housing.

13. A torque transfer device for a vehicle, comprising:
    a housing having a cavity;
    a variable angle constant velocity joint integrated with the housing, and the joint has an outer race connected to a drive mechanism and an inner race connected to an output shaft for transmitting torque from the drive mechanism to the output shaft;
    a boot connected directly to the inner race and the outer race to provide a seal between them; and
    a seal extending between the housing and at least one of a boot cap and the outer race of the joint to prevent a contaminant from entering the cavity;
    wherein the inner race is movable to a plurality of angles with respect to the outer race, wherein the seal is a rotating shaft seal that is press-fit onto the-boot cap.

* * * * *